(12) United States Patent
Wargh et al.

(10) Patent No.: US 9,067,575 B2
(45) Date of Patent: Jun. 30, 2015

(54) BRAKE SYSTEM AND VEHICLE COMPRISING A BRAKE SYSTEM

(75) Inventors: Christian Wargh, Eskilstuna (SE); Mats Akerblom, Eskilstuna (SE); Daniel Jansson, Eskilstuna (SE)

(73) Assignee: Volvo Construction Equipment AB, Eskilstuna (SE)

( * ) Notice: Subject to any disclaimer, the term of this patent is extended or adjusted under 35 U.S.C. 154(b) by 834 days.

(21) Appl. No.: 13/058,206

(22) PCT Filed: Aug. 29, 2008

(86) PCT No.: PCT/SE2008/000484
§ 371 (c)(1),
(2), (4) Date: Feb. 9, 2011

(87) PCT Pub. No.: WO2010/024734
PCT Pub. Date: Mar. 4, 2010

(65) Prior Publication Data
US 2011/0131967 A1  Jun. 9, 2011

(51) Int. Cl.
| | | |
|---|---|---|
| *F16D 31/02* | (2006.01) | |
| *B60T 10/04* | (2006.01) | |
| *F15B 21/04* | (2006.01) | |
| *B60K 6/12* | (2006.01) | |
| *B60T 8/40* | (2006.01) | |
| *B60W 30/18* | (2012.01) | |
| *F04B 1/32* | (2006.01) | |
| *F04B 23/06* | (2006.01) | |

(52) U.S. Cl.
CPC ............... *B60T 10/04* (2013.01); *F15B 21/042* (2013.01); *F04B 1/324* (2013.01); *F04B 23/06* (2013.01); *B60K 6/12* (2013.01); *B60T 8/4095* (2013.01); *B60W 30/18127* (2013.01); *B60Y 2200/14* (2013.01); *Y02T 10/6208* (2013.01); *Y02T 10/6282* (2013.01)

(58) Field of Classification Search
CPC ......... F04B 23/06; F04B 1/324; F15B 21/042
USPC ....................................... 60/494, 456; 91/516
See application file for complete search history.

(56) References Cited

U.S. PATENT DOCUMENTS 3,773,156 A * 11/1973 Nyquist .......................... 477/167
4,537,029 A *  8/1985 Gunda et al. ..................... 60/390

(Continued)

FOREIGN PATENT DOCUMENTS

DE     3618509 A1    12/1987
FR     2381217 A1    9/1978

(Continued)

OTHER PUBLICATIONS

EPA, Regulatory Announcement: Heavy-Duty Engine and Vehicle Standards and Highway Diesel Fuel Sulfur Control Requirements, Dec. 2000.*

(Continued)

*Primary Examiner* — Edward Look
*Assistant Examiner* — Daniel Collins
(74) *Attorney, Agent, or Firm* — WRB-IP LLP

(57) ABSTRACT

A vehicle and a brake system for a vehicle include at least one hydraulic pump, wherein the at least one hydraulic pump is connected to an input fluid conduit and an output fluid conduit. A flow resistance unit is provided in the output fluid conduit of the at least one hydraulic pump for being selectively coupled into the output fluid conduit when brake torque is requested.

12 Claims, 2 Drawing Sheets

(56) References Cited

U.S. PATENT DOCUMENTS

| | | | |
|---|---|---|---|
| 5,006,033 A * | 4/1991 | McConnell | 414/477 |
| 5,090,523 A | 2/1992 | Vogelsang | |
| 5,507,360 A * | 4/1996 | Simmons | 180/406 |
| 5,544,947 A * | 8/1996 | Nishii et al. | 303/116.2 |
| 2004/0108769 A1 * | 6/2004 | Marathe | 303/2 |
| 2006/0230751 A1 * | 10/2006 | Huang et al. | 60/418 |
| 2008/0298977 A1 | 12/2008 | Juricak et al. | |

FOREIGN PATENT DOCUMENTS

| | | |
|---|---|---|
| FR | 2523676 | 9/1983 |
| GB | 2095791 A | 10/1982 |
| WO | WO 2006028042 A1 * 3/2006 | E02F 9/22 |
| WO | 2008069706 A1 | 6/2008 |

OTHER PUBLICATIONS

Supplementary European Search Report for corresponding European App. EP 08794110.

International Search Report for corresponding International Application PCT/SE2008/000484.

International Preliminary Report on Patentability for corresponding International Application PCT/SE2008/000484.

* cited by examiner

BRAKE SYSTEM AND VEHICLE COMPRISING A BRAKE SYSTEM

BACKGROUND AND SUMMARY

The invention relates to a brake system and a vehicle comprising a brake system according to the preambles of the independent claims.

Mobile work machines are vehicles designed for and used in rough off-road surroundings where trucks or passenger cars are inoperative and would be damaged when exposed to these rough conditions. During operation particularly in rough surroundings, the speed of the work machine has to be controlled reliably, particularly at low speed of the work machine, e.g. when operating downhill with a heavy load.

In order to control the speed of the work machine particularly at low speed it is known in the art to use the service brakes, which, however, requires an adequate dimension of the service brakes. Further, it is known to provide an additional hydraulic brake, a so called retarder, which can be e.g. an additional hydraulic pump in the powertrain of an articulated hauler.

U.S. Pat. No. 5,507,360 A1 discloses a hydraulic system for a work machine with a pump which can selectively provide hydraulic fluid to a steering system or a dynamic braking system. A selector valve which is responsive to the pressure in the steering system directs the flow from the pump to the steering system when the pressure drops below a predetermined level. The operator may selectively direct flow from the pump to the dynamic braking system when dynamic braking is needed.

It is desirable to provide a robust and economically priced braking system which fulfils particularly the requirements of work machines. It is also desirable provide an improved vehicle comprising a braking system.

According to a first aspect of the invention, a brake system for a vehicle is proposed, comprising at least one hydraulic pump, wherein the at least one hydraulic pump is connected to an input fluid conduit and an output fluid conduit. A flow resistance unit is provided in the output fluid conduit of the at least one hydraulic pump for being selectively coupled into the output fluid conduit when brake torque is requested.

Favourably, one or more hydraulic, pumps which are already available in the vehicle can be employed and used as a retarder. The retarder effect can be established by transmitting the kinetic energy, i.e. speed of a power source of the vehicle and/or vehicle speed, to heat the hydraulic fluid when there is a brake demand. When a brake torque is requested, the flow resistance unit is brought into operational connection with the output fluid conduit of the at least one pump.

A smaller number of parts is necessary and valuable construction space in the vehicle can be saved as well as costs. The brake system is particularly robust. The reaction time can be very short. It is not necessary to fill the retarder with hydraulic fluid before operation and starting the brake effect. The at least one pump pumps hydraulic fluid, e.g. hydraulic oil, against a low pressure and is already filled up.

Favourably, a power-take-off unit adapted for power-take-off from a vehicle powertrain and that the at least one hydraulic pump can be coupled to the power-take-off unit. Preferably, the power-take-off unit can be arranged between the engine and a main transmission of the vehicle.

According to a preferred embodiment at least one service brake can be provided for performing a primary brake function and the at least one hydraulic pump and the flow resistance unit can form a secondary brake function. Thus, the retarder torque can be controlled by controlling the pressure against which the at least one pump is working.

Generally, the service brake can be a wet or a dry brake. In a wet brake, typically disks which can act on a ground engagement element such as a wheel are arranged in a closed environment filled with a liquid such as oil. In a dry brake, a brake caliper and brake pads acting on a ground engagement element are surrounded by air.

Advantageously, the secondary brake function can be controllable according to operation parameters of the primary brake function.

Favourably, a cooler unit can be arranged downstream of the flow resistance unit.

The cooler unit can be connected to a conventional cooling system of the vehicle.

The kinetic energy is transformed into heat by pumping the hydraulic fluid against the flow resistance generated by the flow resistance unit in the output fluid conduit. The heated hydraulic fluid can be cooled down so that the hydraulic fluid is available at normal operation temperatures for braking as well as for operating hydraulic devices in the vehicle.

According to an embodiment of the invention, the at least one hydraulic pump can be adapted for being selectively coupled to at least one hydraulic cylinder.

Favourably, already available components can be used and can be simply coupled to the flow resistance unit if their action is required. The at least one hydraulic pump can be selectively coupled to at least one hydraulic cylinder when brake torque not is requested. Favourably, the at least one hydraulic pump provides hydraulic fluid for operation of hydraulic cylinders, e.g. for steering the vehicle, for tilting a tiltable platform and the like.

A controllable valve can be provided for switching a fluid flow the at least one pump between different fluid conduits. Favourably, the controllable valve can be embodied as a shift valve, particularly as a 5/2-way valve comprising 5 ports and 2 positions. Preferably, the controllable valve can be arranged in the fluid conduit between the at least one pump and the flow resistance unit.

The flow resistance unit can be a pressure regulating valve. The flow resistance unit can be a throttle. It is also possible to provide a combination of a pressure regulating valve and a throttle. The retarder torque can be controlled by controlling the pressure, i.e. the flow resistance, induced by the flow resistance unit.

According to another aspect of the invention, a vehicle is proposed, comprising a powertrain and a brake system according to anyone of the preceding features. The retarder effect caused by at least one hydraulic pump can be established by transmitting the kinetic energy, i.e. speed of the power source of the vehicle and/or vehicle speed, to heat hydraulic fluid when there is a brake demand.

Preferably, the powertrain can comprise a power source and at least one hydraulic pump which can be coupled to a power-take-off unit arranged downstream of the power source. The power source can comprise an internal combustion engine, an electric motor, any other device which can drive a powertrain of a vehicle or any combination thereof. The at least one pump can be directly driven by the power source of the vehicle.

The power-take-off unit can be arranged between the power source and a main transmission of the vehicle.

Preferably, at least one hydraulic cylinder can be used for at least one of steering the vehicle or tilting a tillable platform of the vehicle.

The invention can be applied to wheel-borne vehicles, track-borne vehicles and vehicles running on rails. Primarily wheel-borne vehicles are intended. The invention is particularly useful for work machines, such as frame-steered articulated haulers, wheel loaders, excavators etc. The invention is particularly applicable in vehicles with a multitude of driven axles and will below be described for a frame-steered articulated hauler for the purpose of exemplification. The invention can also be applied to passenger cars, trucks, buses and other road vehicles but is primarily intended for vehicles used off-road in rough conditions. A fundamental problem for all work machines with drive at a number of ground contact points is to control the vehicle safely at low speed, particularly when high load is carried or moved by the vehicle.

BRIEF DESCRIPTION OF THE DRAWINGS

The present invention may best be understood from the following detailed description of the embodiment, but not restricted to the embodiment, wherein is shown.

DETAILED DESCRIPTION

Figure 1:
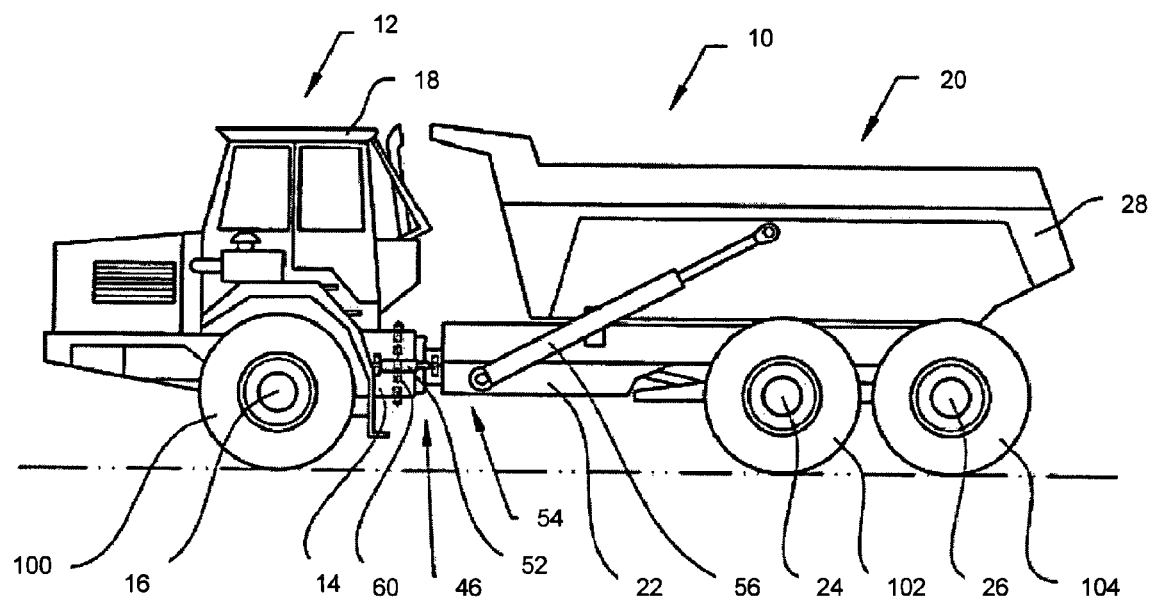
FIG. 1 a side view of a preferred vehicle according to the invention, embodied as an articulated hauler.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts a side view of a preferred vehicle 10 preferably embodied as a frame-steered articulated hauler, in which the method according to the invention can be implemented to test the brake system of the vehicle.

The vehicle 10 embodied as a frame-steered articulated hauler comprises a front vehicle section 12 comprising a front frame 14, a front wheel axle 16 and a cab 18 for a driver. The vehicle 10 also comprises a rear vehicle section 20 comprising a rear frame 22, a front wheel axle 24, a rear wheel axle 26 and a tillable platform body 28.

The front and rear wheel axles 24, 26 of the rear vehicle section 20 are connected to the rear frame 22 via a bogie arrangement (not shown), and will below be referred to as front bogie axle 24 and rear bogie axle 26.

Each one of the front wheel axle 16, the front bogie axle 24 and the rear bogie axle 26 comprises pairwise left and right ground engagement elements in the form of wheels. Only the left ground engagement elements 100a, 102a, 104a are depicted.

Generally, the term "ground engagement elements" include wheels, caterpillar tracks etc. By way of example, the ground engagement elements 100a, 102a, 104a are called wheels 100a, 102a, 104a in the embodiments.

The front frame 14 is connected to the rear frame 22 via a first rotary joint 46 which allows the front frame 14 and the rear frame 22 to be rotated relative to one another about a vertical axis 60 for steering (turning) the vehicle 10. A pair of hydraulic cylinders 52 is arranged on respective sides of the rotary joint 46 for steering the vehicle 10. The hydraulic, cylinders are controlled by the driver of the vehicle via a wheel and/hr a joystick (not shown).

A second rotary joint 54 is adapted in order to allow the front frame 14 and the rear frame 22 to be rotated relative to one another about an imaginary longitudinal axis, that is to say an axis which extends in the longitudinal direction of the vehicle 10.

The platform body 28 is connected to the rear frame 22 via an articulation (not shown), on a rear portion of the rear frame 22. A pair of tilting cylinders 56 is connected with a first end to the rear frame 22 and connected with a second end to the platform body 28. The tilting cylinders 56 are positioned one on each side of the central axis of the vehicle 10 embodied as a frame-steered articulated hauler in its longitudinal direction. The platform body 28 is therefore tilted in relation to the rear frame 22 on activation of the tilting cylinders 56.

The hydraulic cylinders 52 for steering the vehicle 10 and 56 for tilting the tillable platform body 28 are supplied by hydraulic pumps (not shown) with a hydraulic fluid preferably at least one pump is provided for each pair of the hydraulic cylinders 52 and tilting cylinders 56. According to the invention, at least one of the hydraulic pumps used for steering or tilting or operating any other hydraulic device in the vehicle 10 can be used as a hydraulic, retarder.

Figure 2:
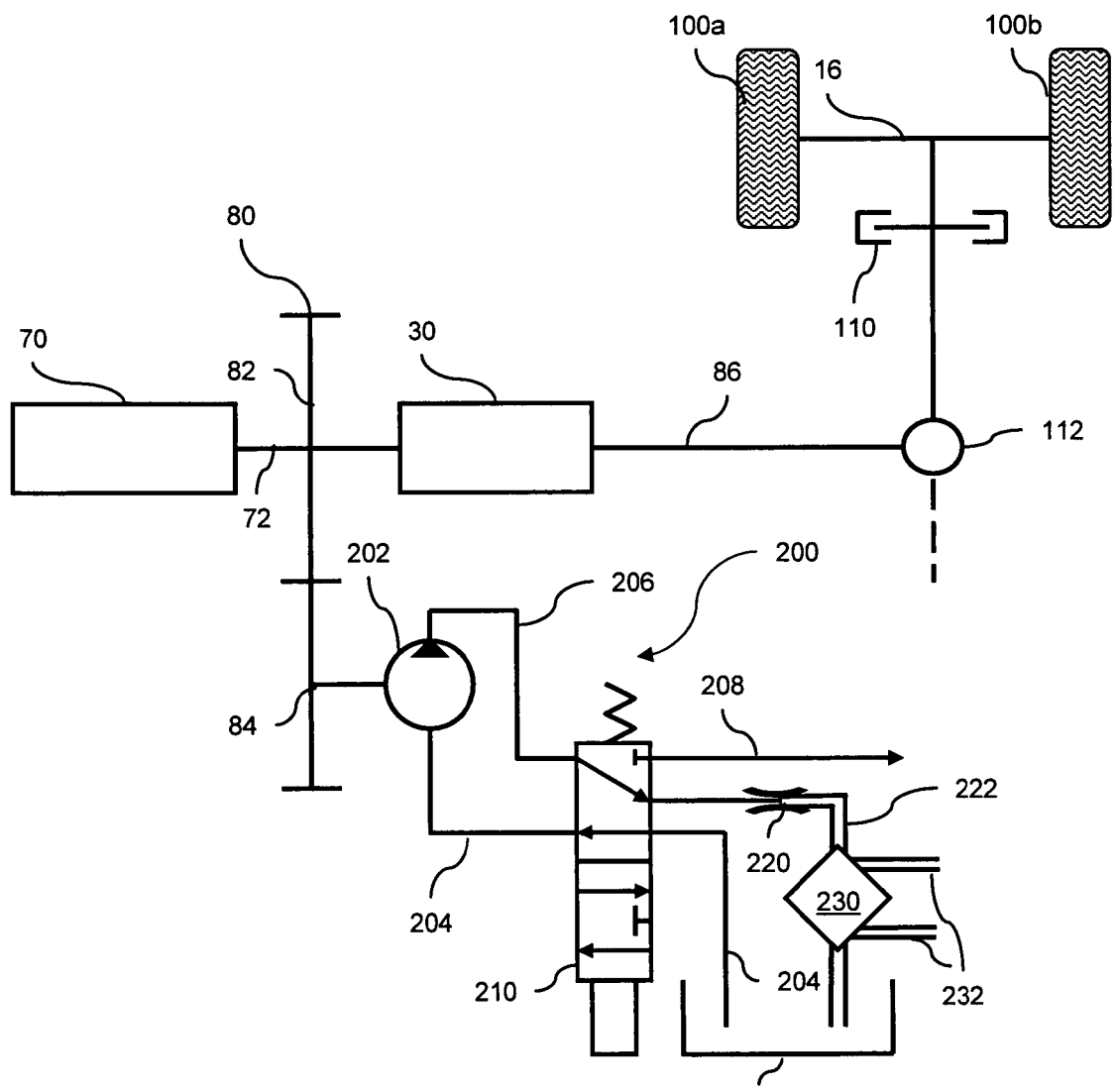
FIG. 2 a schematic sketch of a preferred braking system.

FIG. 2 depicts a schematic sketch of a preferred brake system 200 of a vehicle 10, as is described by way of example in FIG. 1. A hydraulic pump 202 is coupled to a power-take-off unit 80 of a powertrain comprising a power source 70, e.g. an internal combustion engine, wherein the power-take-off unit 80 is arranged between the power source 70 and a main transmission 30 of the vehicle 10 with a drive shaft 86. The drive shaft 86 transmits torque to the ground engagement elements which are symbolized by one wheel pair 100a, 100b on axle 16 in FIG. 2. A differential 112 is provided to distribute torque between the wheels 100a, 100b according to drive conditions of the wheels 100a, 100b.

Particularly, the brake system 200 comprises at least one service brake 110 for performing a primary brake function. The service brake 110 can be a wheel brake, wherein a service brake 110 can be provided for each of the wheels 100a, 100b.

Power from the output shaft 72 of the power source 70 can be supplied to the hydraulic pump 202 by e.g. a gear wheel 82 of the power-take-off 80 which meshes with a gear wheel 84 of the power-take-off 80 to which the hydraulic pump 202 is coupled.

The at least one hydraulic pump 202 is connected to an input fluid conduit 204 and an output fluid conduit 206 and a controllable valve 210 for switching a fluid flow between different fluid conduits 208 and 222.

The fluid conduit 208 provides hydraulic fluid pumped by the hydraulic pump 202 to a hydraulic device in the vehicle, e.g. a pair of hydraulic cylinders 52 for steering the vehicle 10 (FIG. 1) and/or a pair of hydraulic cylinders 56 for tilting the tillable platform 28 (FIG. 1) and the like.

The controllable valve 210 is preferably a shift valve, e.g. a 5/2-way valve, with 5 ports and 2 positions, is arranged in the input and output fluid conduits 204 and 206 of the hydraulic pumps.

When no brake torque is requested, the controllable valve 210 connects the pump output conduit 206 to the hydraulic fluid conduit 208 for normal operation of the hydraulic system.

When a brake torque is requested, the controllable valve 210 connects the fluid output conduit 206 to a fluid conduit 222 which enables the retarder function of the hydraulic pump 202. To make this possible, a flow resistance unit 220, such as a pressure regulating valve or a throttle, can be selectively coupled into the output fluid conduit 206 of the hydraulic pump 202.

The hydraulic pump 202 and the flow resistance unit 220 provide a functionality of a retarder brake in case of a brake torque request.

While the at least one service brake 110 provides a primary brake function, the at least one hydraulic pump 202 and the flow resistance unit 220 provide a secondary brake function.

Favourably, the flow resistance unit 220 can be controllable according to operation parameters of the brake so that the secondary brake function is controllable according to operation parameters of the primary brake function. If a higher brake torque is requested, the flow resistance of the flow resistance unit 220 can be increased, if a lower brake torque is requested, the flow resistance of the flow resistance unit 220 can be decreased.

Downstream of the flow resistance unit 220 a cooling unit 230 is arranged. When the hydraulic pump 202 is coupled to the flow resistance unit 220 in case of a brake request, the hydraulic fluid is pumped against the pressure built up by the flow resistance unit 220 and heated accordingly. The cooling unit 230 can be coupled via cooling fluid conduits 232 to a cooling system, e.g. a conventional cooling system of the vehicle, such as an air cooler or the like, and share the cooling fluid with the cooling system.

If brake torque is required at the same time as hydraulic energy for work hydraulics, in one embodiment priority can be given to the work hydraulics by shifting the controllable valve 210 to supply hydraulic fluid to the fluid conduit 208 and thus stopping the retarder function.

The invention is particularly useful for work machines such as articulated haulers, construction machines and the like. The invention allows for a smaller number of parts to provide additional brake torque particularly at low speed and provides a robust and cost efficient system.

The invention claimed is:

1. A vehicle comprising:
   a powertrain; and
   a brake system comprising at least one hydraulic pump coupled to a power-take-off unit of the powertrain, wherein the at least one hydraulic pump is connected to an input fluid conduit and an output fluid conduit using a controllable valve, and a flow resistance unit is arranged in the output fluid conduit, wherein the controllable valve, is arranged in the input fluid conduit and the output fluid conduit, the at least one hydraulic pump being adapted to be
   selectively coupled into the output fluid conduit when brake torque is requested, and
   selectively coupled to at least one hydraulic cylinder, and to provide fluid to the at least one hydraulic cylinder, whenever no brake torque is requested.

2. A vehicle according to claim 1, further comprising at least one service brake for performing a primary brake function, and wherein the at least one hydraulic pump and the flow resistance unit form a secondary brake function.

3. A vehicle according to claim 2, wherein the secondary brake function is controllable according to operation parameters of the primary brake function.

4. A vehicle according to claim 1, wherein a cooler unit is arranged downstream of the flow resistance unit.

5. A vehicle according to claim 1, further comprising a controllable valve for switching a fluid flow from the at least one pump between different fluid conduits.

6. A vehicle according to claim 5, wherein the controllable valve is arranged in the fluid conduit between the at least one pump and the flow resistance unit.

7. A vehicle according to claim 1, wherein the flow resistance unit is a pressure regulating valve.

8. A vehicle according to claim 1, wherein the flow resistance unit is a throttle.

9. A vehicle according to claim 1, wherein the at least one hydraulic pump is coupled to the power-take-off unit arranged downstream of the power source.

10. A vehicle according to claim 9, Wherein the power-take-off unit is arranged between the power source and a main transmission of the vehicle.

11. A vehicle according to claim 9, wherein the power source comprises an internal. combustion engine.

12. A vehicle according to claim 1, wherein the at least one hydraulic cylinder is used for tilting a tiltable platform of the vehicle.

* * * * *